United States Patent [19]

Dufresne et al.

[11] Patent Number: 4,766,099

[45] Date of Patent: Aug. 23, 1988

[54] CATALYST FOR OIL HYDROREFINING OR MILD HYDROCRACKING OF HEAVY OIL CHARGES TO PRODUCE MIDDLE DISTILLATES

[75] Inventors: Pierre Dufresne, Rueil-Malmaison; Christian Marcilly, Houilles, both of France

[73] Assignee: Institut Francaise du Petrole, Rueil-Malmaison, France

[21] Appl. No.: 860,927

[22] Filed: May 8, 1986

[30] Foreign Application Priority Data

May 14, 1985 [FR] France .................................. 85 07474

[51] Int. Cl.$^4$ ............................................... B01J 21/16
[52] U.S. Cl. ........................................ 502/72; 502/63; 502/84
[58] Field of Search ............................ 502/63, 72, 84; 208/115

[56] References Cited

U.S. PATENT DOCUMENTS

| 3,639,268 | 1/1972 | Jaffe et al. | 502/63 |
| 3,677,971 | 7/1972 | White | 502/63 |
| 4,080,313 | 3/1978 | Whittam | 502/63 |

FOREIGN PATENT DOCUMENTS

| 92858 | 11/1983 | European Pat. Off. | 502/84 |
| 2036699 | 6/1981 | United Kingdom | 502/72 |

Primary Examiner—Carl F. Dees
Attorney, Agent, or Firm—Millen & White

[57] ABSTRACT

The invention concerns a catalyst comprising:
(a) a carrier containing at least 20% by weight of a fluorinated bridged clay of the smectite group,
(b) an amorphous matrix containing at least 10% by weight of alumina, and
(c) at least one group VIII metal or metal compound or an association of at least one group VI B metal or metal compound with at least one metal or compound of a metal selected from group VIII non-noble metal. The metals amount, calculated as oxide(s), in proportion to the final catalyst weight, is from 0.01 to 5% for the group VIII noble metals, from 0.01 to 20% for group VIII non-noble metals and from 5 to 40% for the association of group VI B metals with group VII non-noble metals.

The carrier amount is such that the florinated bridged clay content of the final catalyst is at least 12% by weight; the matrix amount forms the complement to 100% by weight of the catalyst.

The catalysts according to the invention can be used for mild hydrocracking operations having as an object improving the viscosity of the lubricating oils and hydrocracking of heavy oil cuts so as to obtain middle distillates: kerosene and gas oils 14 Claims, No Drawings

CATALYST FOR OIL HYDROREFINING OR MILD HYDROCRACKING OF HEAVY OIL CHARGES TO PRODUCE MIDDLE DISTILLATES

The present invention concerns a catalyst for oil hydrorefining or hydrocracking of heavy oil fractions to gasoline and mainly to middle distillates, kerosene and gas oil, said catalyst comprising at least one bridged clay containing fluorine in its chemical formula.

More precisely, this catalyst comprises in admixture (a) a bridged clay containing fluorine in its chemical formula, pertaining to the smectite group (montmorillonite group), optionally associated with at least one other bridged clay, for example from the smectite group, (b) an amorphous matrix containing alumina, (c) at least one metal from group VIII of the periodic classification of elements, such as for example nickel, cobalt, palladium and platinum, and (d) optionally at least one metal from group VI B of the periodic classification of elements (Handbook of chemistry and physics 37th edition 1956 pages 392–393) such for example as molybdenum and tungsten.

BACKGROUND OF THE INVENTION

Mostly, hydrocracking catalysts comprise a hydrogenating group deposited on an acid carrier. The hydrogenating group is either a noble metal such as palladium or platinum, as mentioned in U.S. Pat. Nos. 3,825,027, 3,890,247 and 4,120,825, or an association of sulfides of metals from group VI B (molybdenum or tungsten) and from group VIII (cobalt or nickel) of the periodic classification of elements, as mentioned for example in U.S. Pat. Nos. 3,132,089 and 3,159,568.

The acid carrier is generally a halogenated alumina, an amorphous silica-alumina or a Y type zeolite wherein at least 70% of the initial sodium has generally been replaced by protons or ions of rare-earth metals. The zeolite carriers are not formed of pure zeolite but, in fact, contain from 10 to 80% of zeolite admixed with an inert or a less active carrier such as alumina or silica-aluminas.

The zeolite catalysts are generally used in hydrocracking operations for a high gasoline production (C. MARCILLY, J. P. FRANCK Catalysis by Zeolites. Edt by IMELIK and al., Elsevier Scientific Publish. Comp., Amsterdam, 1980, 93–104; Iranian Petroleum Institute, Bulletin 66, 1977, 17.) As a matter of fact, their particular selectivity is not well adapted to the manufacture of middle distillates, such as for example as kerosene and gas oil. The selectivity to middle distillate a is much better with catalysts prepared from amorphous carriers of the silica-alumina type, which are much less acid than the zeolites.

The mixed silica-aluminas best adapted to a high production of middle distillates are those containing from 15% to 60% by weight of $SiO_2$ in the oxide. (M: CHOUDHARY, e.a., Ind. Eng. Chem. P.R.D., vol. 14 (2), 1975, 74–83).

Various recent patents mention the use, for hydrocracking of heavy cuts, of bridged clays associated with a catalytic metal from groups I B to VIII of the periodic classification of elements, such for example as a noble metal, nickel, cobalt, tungsten or molybdenum. U.S. Pat. No. 4,176,090, for example, discloses the use for hydrocracking of a bridged clay containing, for example, palladium. In this patent, however, no precise statement is made concerning the cut.

U.S. Pat. No. 4,248,739 discloses for example the use of bridged clays, in particular for the manufacture of catalysts containing such metals as palladium, platinum, cobalt, molybdenum, nickel, tungsten and rare earths. The obtained catalysts are particularly useful in the reactions of hydrocarbons conversion such for example as hydrocracking. However this patent gives no precise detail concerning the cuts or the performance.

On the other hand, the use of fluorinated clays, which are not bridged, in various reactions involving hydrocarbon conversion, in the presence or absence of hydrogen, has been considered or mentioned in the literature: A.C.S. Vol. 18 1973, Division of Petroleum Chemistry preprints meeting of Dallas, Apr. 8–13 pages 33 to 51 Hattori H et al., and U.S. Pat. No. 3,855,147.

Moreover, the use in hydrocracking and hydroisomerization reactions of fluorinated clays, wherein a portion or the totality of the aluminum in octahedral position has been replaced by nickel or cobalt, has been mentioned in A.C.S. Vol. 20, 1975, Division of Petroleum Chemistry, preprints, meeting of Philadelphia, April 6–11, pages 522 to 534 and claimed in U.S. Pat. No. 3,966,642.

All the clays mentioned in the preceding references pertain to the category of smectites, a description of which is given hereinafter.

SUMMARY OF THE INVENTION

It has been discovered, according to the present invention, that the use of a bridged and fluorinated clay pertaining to the smectite group (montmorillonite group) provides catalysts which can be used in mild hydrocracking operations having as an object improving the viscosity properties of lubricating oils or in mild hydrocracking operations performed on heavy oil cuts at a low total pressure (at most 10 Megapascals (MPa) or further in more extensive hydrocracking operations performed on heavy oil cuts, under a pressure generally higher than 10 MPa, in order to obtain a maximum selectivity to middle distillates (kerosene and gas oil). The so-obtained catalysts have better performances than those of the conventional catalysts mainly consisting of silica-aluminas or those of catalysts basically formed of non fluorinated bridged smectites or non bridged fluorinated smectites.

Some clays have a lamellar structure wth expansible lattice. They have the particular property of adsorbing various solvents, particularly water, between the leaves of which they are composed, thus producing a swelling of the solid as a result of the weakening of the electrostatic bonds between the leaves. These clays essentially pertain to the smectite group (or montmorillonite group) and some of them to the vermiculite group. Their structure is formed of elementary leaves with three layers: two simple layers of $SiO_4$ tetrahedrons wherein a part of the silicon may be replaced with other cations in tetrahedral position such as $Al^{3+}$ or optionally $Fe^{3+}$, and, between these two tetrahedral layers, a layer of oxygen octahedrons at the center of which are located metal cations such for example as $Al^{3+}$, $Fe^{3+}$, $Mg^{2+}$. This octahedral layer consists of a compact stacking of oxygens originating either from the apices of the preceding tetrahedrons or from OH hydroxyl groups. The compact hexagonal lattice of these oxygens contains 6 octahedral cavities. When the metal cations are engaged in four of said cavities (two cavities out of three, as for aluminum) the layer is called dioctahedral, when they are engaged in all the cavities (as for example for magnesium), three cavities out of three, the layer is called trioctahedral.

The elementary leaves of said clays bring negative charges which are compensated by the presence of exchangeable cations, alkali cations such for example as $Li^+$, $Na^+$, $K^+$, alkaline-earth cations such for example as $Mg^{2+}$, $Ca^{2+}$, and optionally the hydronium ion $H_3O^+$. The smectites have charge densities on the leaves smaller than those of the clays of vermiculite type: about 0.66 charge per elementary mesh as compared with about 1 to 1.4 charge per elementary mesh for the clays of vermiculite type. The compensation cations are essentially sodium and calcium in smectites, magnesium and calcium in vermiculites. With respect to the charge densities, smectites and vermiculites are intermediate between talc and pyrophyllite whose leaves are neutral, on the one hand, and micas on the other hand, characterized by a high charge density on the leaves (about 2 per elementary mesh) generally compensated by $K^+$ ions.

The interfoliated cations of the smectites and of the vermiculites may be rather easily replaced by ionic exchange with other cations such for example as ammonium ions or ions of alkaline-earth metals or of rare-earth metals.

The swelling properties of the clays depend on various factors including the charge density and the nature of the compensation cations. Thus, the smectites, whose charge density is lower than that of vermiculites, exhibit swelling properties clearly higher than the latter and hence constitute a very interesting category of solids. The recurrent distance or basal spacing is the shortest distance between two crystallographically identical recurrent units located on two adjacent leaves.

Examples of phyllitous "swelling" silicates of the smectite type are in the main solids complying with the general formula:

$$(M1^{n+})_{x/n}(M2)_2^{VI}(M3)_4^{IV}O_{10}(OH)_2$$

wherein
M1 is the interfoliated cation
M2 is the metal in octahedral position
M3 is the metal in tetrahedral position.
The dioctahedral smectites:
montmorillonite (H, Na, $Ca_{1/2}$)$_x$($Mg_xAl_{2-x}$)$^{VI}Si_4^{IV}O_{10}(OH)_2$
beidellite (H, Na, $Ca_{1/2}$)$_x Al_2^{VI}(Al_xSi_{4-x})^{IV}O_{10}(OH)_2$
nontrolite (H, Na, $Ca_{1/2}$...)$_x$(Fe,Al)$_2^{VI}(Al_xSi_{4-x})^{IV}O_{10}(OH)_2$
The trioctahedral smectites:
hectorite $Na_x(Li_xMg_{3-x})^{VI}Si_4^{IV}O_{10}(OH)_2$
Saponite $Na_xMg_3^{VI}(Al_xSi_{4-x})^{IV}O_{10}(OH)_2$
Stevensite $Na_{2x}Mg^{IV}_{3-x}Si_4^{IV}O_{10}(OH)_2$ A part of the OH located on some apices of octahedrons may be replaced with fluorine atoms, as described by Hattori H et al, above mentioned. Fluorine inside the structure is very stable since it cannot be removed except at high temperature (higher than about 750° C.) in the presence of steam.

After adsorption to saturation of water or of an organic polar solvent in a smectite, the interfoliate spacing (between two leaves) is at maximum. It may reach a value of about 1 nanometer (nm). These solids are potentially interesting for catalysis since their specific surface and their potential acidity are high. Smectites unhappily suffer from the disadvantage of losing their expanded form by heating at 100° C. and, consequently, they do not keep the specific surface increase resulting from their expansion.

Various methods have been described in the prior art for introducing, between the leaves of the smectites, pillars or bridges so as to obtain bridged smectites which keep a high interfoliate spacing after they have been subjected to a thermal treatment.

The method consisting of introducing bridges formed of oligomers of a metal hydroxide, particularly of aluminum hydroxide, has been disclosed by LAHAV, SHANI and SHABTAI in Clays and Clays Mineral, vol. 26 (No. 2), p. 107–115 (1978) and in the French patent application No. 2,394,324. Their preparation and use in catalytic cracking is also disclosed in U.S. Pat. No. 4,238,364. The formation of bridges consisting of oligomers of aluminum and magnesium hydroxides, zirconium hydroxides, silicium and boron mixed hydroxides, is disclosed in U.S. Pat. No. 4,248,739. A technique for bridging smectites, by dialysis, using for example aluminum, chromium, zirconium and titanium hydroxides, is claimed in the European patent application EP-A No. 73718. Other methods for clay bridging are mentioned for example in U.S. Pat. No. 4,248,739, column 3, lines 1 to 52.

These methods consist, in their principle, of contacting the clay with a solution containing more or less oligomerized ionic species of the hydroxy-aluminum type (when aluminum is concerned). This operation is mostly achieved in a weakly concentrated solution, at a temperature lower than 100° C. and, if possible, in the absence of turbidity due to a beginning precipitation of the hydroxide. The metal ion and clay concentrations must be optimized in order to form a sufficient number of solid pilars and to avoid a high decrease of the clay porosity by insertion of too large an amount of metal oxide.

When the alkali or the alkaline-earth interfoliated ions are replaced with protons either directly by means of a very diluted aqueous solution of an acid or, preferably, by exchange with an ammonium salt, followed with a roasting between 300° and 700° C., the bridged smectites acquire a strong acidity, although lower as a whole than that of the conventional zeolites of Y or mordenite type, for example. This acidity may be advantageously used in cracking of heavy molecules in the presence of hydrogen.

According to the present invention, the acid fluorinated bridged smectite obtained according to the preceding techniques may be particularly characterized by its charge density, its specific surface, the value of its basal spacing and its fluorine content. The bridged smectites particularly desirable for hydroconversion catalysts according to the present invention are those for which the values of the four above-mentioned characteristics are comprised within the following respective ranges:
  charge density: 0.6 to 1.8 gram/milliequivalent ($meq.g^{-1}$)
  specific surface: 200 to 600 $m^2.g^{-1}$
  basal spacing: 1.6 to 2.0 nm
  fluorine content from 0.01 to 4% by weight of fluorine and preferably from 0.1 to 3% by weight.

The so-defined fluorinated bridged smectite is incorporated into an amorphous matrix mainly consisting of alumina. More precisely, this matrix comprises alumina optionally associated with at least one of the following oxides: boron oxide, magnesia, silica, titanium oxide, chromium oxide, zirconia. Fluorinated bridged smectite may be also admixed with a non-fluorinated bridged smectite before its incorporation into an amorphous substance.

The fluorinated bridged smectite may advantageously be prepared during the step of incorporating the original smectite to the alumina matrix. The simpler incorporation technique consists of mixing the wet smectite with the wet gel (previously peptized by acid addition) of the oxides forming the matrix.

Probably the hydroxy-aluminum ionic oligomers released during the peptization of the gel migrate and are inserted during the mixing operation in the smectite leaves.

The catalysts according to the present invention comprise:

(a) a carrier containing at least 20% by weight of fluorinated bridged clay pertaining to the smectite group, (b) an amorphous matrix containing at least 10% by weight and preferably at least 30% by weight of alumina, (c) a hydrogenating group containing at least one metal or compound of metal selected from metals of group VIII of the periodic classification of elements or a combination comprising one metal or compound of metal selected from the metals from group IV B and at least one metal or compound of metal selected from the non-noble metals of group VIII, the carrier amount being sufficient to obtain a fluorinated bridged smectite content of at least 12% by weight with respect to the weight of the final catalyst; the total metals content, calculated as oxide(s) of this or these metals amounting to 0.01–15% by weight for non-noble metals of group VIII and to 0.1–5% for noble metals of group VIII and the total metals content, expressed as oxide(s) of this or these metals amounting to 5–40% by weight for a combination of at least one metal or compound (particularly oxide) of metal free group VI B with at least one metal or compound of metal selected from non-noble metals of group VIII (particularly cobalt oxide or nickel oxide), the complement consisting of the amorphous matrix.

An amorphous matrix consisting of silica-alumina containing at least 40% by weight of alumina is advantageously used.

When the carrier is formed of a mixture of fluorinated bridged smectite with a non-fluorinated bridged clay, it is advantagous to use mixtures containing 5–50% by weight of non-fluorinated bridged clay, the non-fluorinated bridged clay being advantageously from the smectite group.

The hydrogenating group is advantageously selected from the group formed of noble metals from group VIII and associations comprising at least one group VI B metal oxide and at least one group VIII non-noble metal oxide.

The hydrogenating group may be introduced in the catalyst at different steps of its manufacture and in various manners.

It may be introduced only partly (for associations of group VI B and VIII metal oxides) or in totality during the mixing of the smectite with the oxide gel selected as matrix. It may be introduced in one or more ionic exchange operations on the roasted carrier formed of smectite dispersed in the selected matrix, by means of solutions containing the precursor salts of the selected metals when the latter pertain to group VIII. It may be introduced in one or more impregnation steps of the shaped and roasted carrier, by means of a solution of precursors of oxides of group VIII metals (mainly Co and/or Ni) when the precursors of oxides of group VI B metals (Mo and/or W) have been previously introduced during the mixing of the carrier. It may finally be introduced in one or more impregnations of the roasted carrier, formed of the smectite and the matrix, by solutions containing precursors of group VI B and/or VIII metals oxides, the precursors of group VIII metals oxides being preferably introduced after those of group VI B or simultaneously with the latter. The main precursor salts which can be used are, for example: for group VIII (cobalt or nickel): nitrate, acetate, sulfate of hydrated divalent cations or hexamine cations

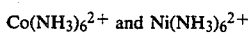

$Co(NH_3)_6^{2+}$ and $Ni(NH_3)_6^{2+}$ for the group VI B (Mo or W): the various known ammonium molybdates or tungstates.

When the metal oxides are introduced in several impregnations of the corresponding precursor salts, an intermediate roasting step of the catalyst must be performed at a temperature ranging from 250° to 600° C.

Molybdenum impregnation may be facilitated by addition of phosphoric acid in the solutions of ammonium paramolybdate.

The concentrations of metal compounds, expressed as weight of oxide(s) are as follows: 0.01 to 5% by weight of group VIII metal oxide(s), preferably 0.03 to 3% by weight when only the noble metals of group VIII, such for example as palladium or platinum, are concerned, 0.01 to 20% by weight of group VIII metals oxide(s) and preferably 0.05 to 15%, when non-noble metals from group VIII such as, for example, nickel or cobalt are concerned. With the combination of at least one group VIII metal or metal compound and at least one group VI B metal compound, there is used about 5 to 40% by weight, expressed as oxide(s) weight, of a combination of at least one compound (mainly oxide) of a metal from group VI B (mainly molybdenum or tungsten) and of at least one metal or compound of metal from group VIII (mainly cobalt or nickel), and preferably 10 to 30%, with a ratio by weight (expressed as metal oxides) of the group VIII metals to the group VI B metals advantageously of 0.05–0.8 and preferably 0.10–0.50. Advantageous metal pairs are Ni+Mo, Co+Mo, Ni+W, Co+W.

The so-obtained catalysts may be advantageously used in oil hydrorefining operations in order to improve the viscosity properties of the oils used for engines lubrication and whose initial boiling point is higher than 400° C., under the following operating conditions of temperature, total pressure, feed space velocity (VVH) and hydrogen/hydrocarbons (H₂/HC) ratio:

Temperature: about 300°–500° C.

Pressure: about 35–200 bars (3.5–20 MPa)

VVH: about 0.2–2 liters of charge per liter of catalyst and per hour.

H₂/HC: about 250–1500 liters per liter

These catalysts are however preferred for hydrocracking of heavy cuts where they exhibit an improved activity as compared with those of the prior art and, in addition, have an improved selectivity for producing middle distillates of very good quality.

The charges treated in this process are gas oils, vacuum gas oils, deasphalted or hydrotreated residues or equivalent fractions. They consist of at least 80% by volume of components of boiling points ranging from 350° to 580° C. They contain heteroatoms such as sulfur and nitrogen. The hydrocracking conditions such as temperature, pressure, hydrogen recycle rate, hourly volume velocity, will have to be adapted to the nature of the charge, characterized in particular by the range of the boiling points, the content of aromatics or polyaromatics, the heteroatom content. The nitrogen content is generally from 5 to 2000 ppm and the sulfur content from 50 to 30000 ppm.

These catalysts are much preferred to the conventional catalysts for slightly converting heavy charges (I.P. higher or equal to 350° C.) while denitrogenating and desulfurizing them. The conversion rates are from 15 to 50%, expressed as yield of products of boiling point lower than 350° C. In these conditions, the reactor contains two catalysts the first of which is a conventional hydrotreatment catalyst having as an object the provision for the most part of the denitrogenation and desulfurization activity and the second a hydrocracking catalyst whose object is to provide for the most part of the conversion to products of boiling point lower than 350° C.

The action of the second hydrocracking catalyst may be perfectly assumed by one of the catalysts prepared according to the present invention. The working conditions of this second catalyst are within the following ranges:

Temperature: about 360°–450° C.
Total pressure: about 35–90 bars (3.5–9 MPa)
VVH: about 0.3–1.5
$H_2/HC$: about 250–1000 1/1

In the following examples, the hydrogenating group consists of a $MoO_3$—NiO association in respective proportions of 14% and 3% by weight with respect to the weight of the final catalyst.

The activity of the catalyst is compared by means of the following tests:

tests (MM) on model molecules = in test $MM_1$ the charge consists of a mixture containing 79.6% by weight of cyclohexane, 19.9% by weight of toluene and 0.5% of thiophene; in test $MM_2$ the charge consists of a mixture containing 79.2% by weight of cyclohexane, 19.8% by weight of toluene, 0.5% by weight of n-hexylamine and 0.5% of thiophene.

The catalyst according to the present invention forms the totality of the reactor catalyst bed.

test GL on a charge consisting of a heavy gas oil whose characteristics are given in Table 1 below. Tests GL are performed at 3 different pressures; these tests are called $GL_1$, $GL_2$, $GL_3$.

The catalyst according to the present invention is placed as a second part of the catalyst bed of the reactor, the first part being occupied by a conventional industrial hydrotreatment catalyst HR 306 sold by PROCATALYSE Company and consisting of an association of cobalt and molybdenum oxides deposited on alumina. The volume amounts of the two catalysts placed in the reactor are identical.

TABLE 1

| CHARACTERISTICS OF THE CHARGE = HEAVY GAS OIL - ARAMCO 400 | |
|---|---|
| DISTILLATION (°C.): | |
| Initial Pt | 361 |
| 10% | 443 |
| 30% | 477 |
| 50% | 497 |
| 70% | 515 |
| 90% | 535 |
| 100% | 568 |
| Sulfur % by weight | 2.7 |
| Nitrogen % by weight | 0.119 |
| Density $d_4^{20}$ 20° C. | 0.927 |
| Refraction index 70° C. | 1.5017 |
| Viscosity | |
| 50° C. | 79.0 cSt (79 × $10^{-6}$ $m^2$/sec) |
| 100° C. | 12.6 cSt (12.06 × $10^{-6}$ $m^2$/sec) |
| Pour point °C. | +48 |
| Aniline point °C. | +85.8 |

Before each test, the catalysts are subjected to a previous sulfurization for 8 hours with the charge used for the test, in the following conditions:

injection of the sulfurized charge or gas oil and hydrogen at 150° C., 1 hour step at said temperature, progressive temperature increase from 150° to 220° C. in 1 hour and then a 2 hour step at 220° C., progressive temperature increase from 220° to 300° C. in 1 hour followed with a 4 hours step at 300° C.

The catalysts after said sulfurization are then tested in the following operating conditions:
(1) for tests MM:
P=6.0 MPa (60 bars)
VVH=2
$H_2/HC$=500 1/1
Temperature:
for test $MM_1$ (without hexylamine: 350° C.)
for test $MM_2$ (with hexylamine: 400° C.)
(2) for tests GL:
T=400° C.
VVH=1
P=10 MPa $H_2/HC$=800 1/1 for test $GL_1$
P=7 MPa $H_2/HC$=550 1/1 for test $GL_2$
P=4 MPa $H_2/HC$=300 1/1 for test $GL_3$

EXAMPLES

The following examples are given to illustrate the invention and must not be considered as limiting the scope thereof.

The following examples 1 to 5 describe the preparation of the catalysts A to E. Catalysts C and E are used for comparison purposes.

EXAMPLE 1

Preparation of a fluorinated bridged smectite and of the corresponding hydrocracking catalyst according to the invention.

114 g of a fluorinated synthetic montmorillonite sold by BAROID Company NL Industry Division (HOUSTON-TEXAS) under the name SMM mica-montmorillonite and whose main characteristics are given in Table 1, are dipped into 2.5 liters of distilled water for 24 hours.

TABLE 1

| Characteristics of SMM mica-montmorillonite |
|---|
| Theoretical chemical formula: |
| $(NH_4^+)_x[(Al_4)^{Octa}(Si_{8-x}Al_x)^{tetra}O_{20}(OH,F)_4]^{(x)-}$ |
| x = about 1.4 |
| Composition (% by weight): |
| $SiO_2$ = 48    $Al_2O_3$ = 37 |
| $NH_3$ = 2.6    F = 1.6    $H_2O$ = 12 |
| S = 110 – 160 $m^2 \cdot g^{-1}$ |
| Ionic exchange capacity = 1.5 – 1.6 meq $\cdot g^{-1}$ |

TABLE 1-continued

Characteristics of SMM mica-montmorillonite

Product as microspheres of 20–80 micrometers (μm)

Simultaneously a 0.2M solution of AlCl$_3$ is neutralized by addition of diluted ammonia up to a pH 4 and aged for 24 hours. 1.5 liter of said last solution is added to the preceding suspension of SMM mica-montmorillonite and the mixture is vigorously stirred for 24 hours. The resultant solid is washed and centrifuged. Its basal spacing is 1.82 nm after drying at 120° C.

An amount equivalent to 100 g of Al$_2$O$_3$ alumina, available as pseudo-boehmite, obtained by hydrolysis of aluminum alcoholate and sold by CONDEA Company under the trade mark PURAL, is progressively moistened and peptized by slow addition of an aqueous solution of nitric acid up to the achievement of a very viscous paste which is maintained under stirring by mixing for 20 minutes. The preceding bridged clay is added to said paste and the mixing is continued for 30 additional minutes. The resultant product is extruded as small sticks of 1.2 mm diameter, dried for 4 hours at 120° C. and then roasted for 2 hours at 500° C.

100 g of the so-obtained product are impregnated without solution excess by 77 cc of a solution of ammonium heptamolybdate containing a molybdenum amount equivalent to 17.6 g of MoO$_3$, dried at 150° C. and roasted for 2 hours at 300° C. It is again impregnated without excess of solution by 66 cc of a nickel nitrate solution containing a nickel amount equivalent to 3.8 g of NiO. The wet solid is dried at 150° C., then roasted for 3 hours at 520° C.

The resultant catalyst, called catalyst A, has the following characteristics:
- Carrier=41.5% by weight (the carrier consisting of 100% of fluorinated bridged smectite)
- Matrix=41.5% by weight (Al$_2$O$_3$)
- S=262 m$^2$.g$^{-1}$
- Total pore volume TPV=0.65 cm$^3$.g$^{-1}$
- MoO$_3$=14% by weight
- NiO=3% by weight

EXAMPLE 2

Preparation of a fluorinated bridged smectite and of the corresponding hydrocracking catalyst conforming with the invention.

114 g of the same synthetic montmorillonite as that of example 1 is intimately admixed with a PURAL amount equivalent to 100 g of Al$_2$O$_3$. While mixing, a diluted solution of nitric acid is added to the mixture, up to the achievement of a very viscous paste. A small amount of distilled water is further added (about 10 to 20 cm$^3$), said amount being just sufficient to clearly decrease the viscosity of the paste without however resulting in the formation of a pasty suspension where a clear separation between the solid and the solution would appear at rest. The mixing is continued for 5 hours at room temperature while maintaining the state of viscosity of the paste by progressive additions of distilled water. The mixing is continued for 2 further hours while slightly drying to obtain a viscosity adapted to the subsequent extrusion step. Said extrusion provides small sticks of 1.2 mm diameter.

The resultant mixture is dried for 4 hours at 120° C., then roasted for 2 hours at 500° C.

100 g of this mixture formed of fluorinated bridged smectite and alumina are used to successively impregnate ammonium heptamolybdate and nickel nitrate according to a technique identical to that already described in example 1.

The obtained catalyst B has the following characteristics:
- Carrier=41.5% by weight (the carrier consisting of 100% of fluorinated bridged smectite)
- Matrix=41.5% by weight (Al$_2$O$_3$)
- S=250 m$^2$.g$^{-1}$
- TPV=0.58 cm$^3$.g$^{-1}$
- MoO$_3$=14% by weight
- NiO=3% by weight

EXAMPLE 3 (comparative)

Preparation of a non fluorinated bridged smectite and of the corresponding hydrocracking catalyst An amount equivalent to 100 g of anhydrous product, of Wyoming bentonite sold by CECA Company (11 avenue Morane-Saulnier, 78140 VELIZY-VILLACOUBLAY-FRANCE) and consisting essentially of a non-fluorinated clay of montmorillonite type is subjected to a treatment in aqueous suspension identical to that of example 1. The obtained bridged clay has a basal spacing of 1.86 nm after drying at 120° C.

As in example 1, this clay is mixed with PURAL alumina, extruded, dried, roasted and then successively impregnated by a solution of molybdenum salt and then by solution of nickel salt.

After drying at 150° C. and roasting at 520° C. for 3 hours, the final catalyst, called catalyst C, has the following characteristics:
- Carrier=41.5% by weight (the carrier consisting of 100% of non fluorinated bridged smectite)
- Matrix=41.5% by weight (Al$_2$O$_3$)
- S=265 m$^2$.g$^{-1}$
- TPV=0.69 cm$^3$.g$^{-1}$
- MoO$_3$=14% by weight
- NiO=3% by weight

EXAMPLE 4

Preparation of a mixture of bridged smectites and corresponding hydrocracking catalyst Equivalent amounts in anhydrous state of SMM fluorinated synthetic mica-montmorillonite and of Wyoming bentonite are admixed and from the resultant mixture a hydrocracking catalyst D is prepared in conditions similar to those of example 1, said catalyst having the following characteristics:
- Carrier=41.5% by weight (the carrier consisting of 50% by weight of fluorinated bridged smectite and 50% by weight of non fluorinated bridged smectite)
- Matrix=41.5% by weight (Al$_2$O$_3$)
- Proportion of fluorinated bridged smectite with respect to the final catalyst=20.75% by weight.
- S=270 m$^2$.g$^{-1}$
- TPV=0.66 cm$^3$.g$^{-1}$
- MoO$_3$=14% by weight
- NiO=3% by weight

EXAMPLE 5 (comparative)

Preparation of a non bridged fluorinated smectite and corresponding hydrocracking catalyst 114 g of the same synthetic montmorillonite as that of example 1 is moistened by addition of distilled water up to the obtainment of a very viscous paste.

A diluted solution of nitric acid is added to an amount of PURAL equivalent to 100 g of alumina up to the obtainment of a very viscous paste. The mixing is performed for 20 minutes while progressively adding very small water amount just sufficient to maintain a constant viscosity.

The two resultant pastes are admixed by mixing for about 20 minutes and then the mixture is extruded as small sticks of 1.2 mm diameter.

The so-obtained product is dried for 4 hours at 120° C., then roasted for two hours at 500° C.

100 g of that product consisting of a mixture of non bridged fluorinated smectite and alumina are impregnated with ammonium heptamolybdate and nickel nitrate according to the technique described in example 1.

The obtained catalyst F has the following characteristics:

Carrier: 41.5% by weight (the carrier consists of 100% of a non bridged fluorinated smectite)
Matrix=41.5% by weight ($Al_2O_3$)
$MoO_3$=14% by weight
NiO=3% by weight
S=140 $m^2.g^{-1}$
Total pore volume TPV=0.27 $cm^3.g^{-1}$

EXAMPLE 6 (comparative)

Preparation of silica-alumina by coprecipitation and of the corresponding catalyst containing 3% by weight of NiO and 14% by weight of $MoO_3$ (catalyst not conforming with the invention)

A silica-alumina containing 25% by weight of $SiO_2$ and 75% by weight of $Al_2O_3$ is prepared by coprecipitation at pH 8 from solutions of sodium silicate, on the one hand, and of aluminum nitrate, on the other hand. After 4 washings with distilled water and 4 successive washings with a diluted solution of ammonium nitrate, the $Na_2O$ content measured on the dry product is 0.05% by weight. The moist carrier is then slowly dried at 80° C. so as to obtain the moistness degree desired for its shaping by extrusion. The latter is achieved by passing the gel through a drawing-plate so selected as to obtain extrudates of 1 mm diameter.

The extrudates are dried at 150° C. and then roasted for 3 hours at 550° C. They have the following characteristics:

S=380 $m^2.g^{-1}$
TPV=0.602 $cm^3.g^{-1}$

The so-obtained carrier is successively impregnated with solutions of ammonium heptamolybdate and of nickel nitrate according to a technique identical to that described in example 1. This catalyst is called catalyst E.

It has the following characteristics:

Carrier=87% by weight (including 21.75% by weight of $SiO_2$ and 65.25% by weight of alumina).
S=347 $m^2.g^{-1}$
TPV=0.513 $cm^3.g^{-1}$
$MoO_3$=14% by weight
NiO=3% by weight

EXAMPLE 7

Performance of catalysts A to F in tests MM on model molecules (toluene and cyclohexane)

Table 2 gives the comparative performances of various catalysts measured first at 350° C. on a charge not containing n-hexylamine (test $MM_1$), then at 400° C. on a charge containing 0.5% by weight of n-hexylamine (test $MM_2$), after 20 hours of operation in each of these conditions. The performances are expressed by the value of the rate "H" of toluene hydrogenation to methylcyclohexane and the rate "I" of cyclohexane isomerization to methylcyclopentane.

TABLE 2

| CATA-LYST | Carrier + matrix Ratio by weight | TEST $MM_1$ 350° C. H | I | TEST $MM_2$ 400° C. H | I |
|---|---|---|---|---|---|
| A | Fluorinated bridged smectite + $Al_2O_3$ (50/50) | 42 | 8.5 | 29 | 7.5 |
| B | Fluorinated bridged smectite + $Al_2O_3$ (50/50) | 41 | 8.1 | 30 | 7.3 |
| C | Non fluorinated bridged smectite + $Al_2O_3$ (50/50) | 41 | 7.1 | 29.5 | 6.1 |
| D | Mixture* of fluorinated and non fluorinated smectites + $Al_2O_3$ (50/50) | 41.5 | 7.9 | 29.5 | 6.8 |
| E | Carrier alone $SiO_2$—$Al_2O_3$ (25/75) | 43 | 7.2 | 32 | 6.0 |
| F | Non bridged fluorinated smectite + $Al_2O_3$ (50/50) | 41 | 2.1 | 28.8 | 2.0 |

*50% of fluorinated bridged smectite + 50% of non fluorinated bridged smectite.

The results show that, in the presence of model molecules of low molecular weight (cyclohexane and toluene), catalysts A, B and D according to the present invention are not clearly better than the comparison catalysts C and E, as far and the hydrogenating activity and the isomerizing activity are concerned; they are not clearly better than catalyst F for the hydrogenating activity, but have a better isomerizing activity than catalyst F.

EXAMPLE 8

Performances of catalysts A to F in test GL performed on heavy gas oil

Table 3 gives the comparative performances of the various catalysts, measured at 400° C. under the respective 3 total pressures: 10, 7 and 4 MPa, after 72 hours of operation in each condition. These performances are expressed by the total conversion "TC" to products boiling below 380° C. and by the yield to 160°–380° C. gas oil "GY".

TABLE 3

| CATA-LYST | Carrier + matrix Ratio by weight | 10 MPa TC | GY | 7 MPa TC | GY | 4 MPa TC | GY |
|---|---|---|---|---|---|---|---|
| A | Fluorinated bridged smectite + $Al_2O_3$ (50/50) | 43.1 | 37.2 | 39.3 | 33.7 | 34.5 | 28.5 |
| B | Fluorinated bridged smectite + $Al_2O_3$ (50/50) | 41.2 | 35.7 | 36.9 | 31.1 | 32.0 | 26.8 |
| C | Non fluorinated bridged smectite + $Al_2O_3$ (50/50) | 37.5 | 31.9 | 33.1 | 27.2 | 28.5 | 23.2 |
| D | Mixture of A and C smectites + $Al_2O_3$ (50/50) | 41.5 | 35.8 | 37.7 | 32.2 | 33.3 | 27.4 |
| E | Carrier alone $SiO_2$—$Al_2O_3$ (25/75) | 33.8 | 28.2 | 31.5 | 25.8 | 27.1 | 22 |
| F | Non bridged fluorinated smectite + $Al_2O_3$ (50/50) | 18.5 | 13.1 | 15.9 | 11.2 | 11.1 | 8.0 |

These results show the advantage of catalysts A, B and D according to the present invention as compared with the reference catalysts C, E and F for hydroconverting a heavy charge. They also show that the mixture of two bridged smectites, one fluorinated and the other non-fluorinated (catalyst D), not only gives better performances than the single non fluorinated bridged smectite but also gives surprisingly performances close to those of the fluorinated bridged smectites which are in any way higher than the values obtained by linear combination of the values corresponding to the two smectites.

What is claimed as the invention is:

1. A catalyst containing (a) a carrier, (b) an amorphous matrix and (c) at least one group VIII metal or compound of a group VIII metal or an association comprising a group VI B metal or metal compound and at least one non-noble group VIII metal or metal compound, wherein in said catalyst:

the carrier contains at least 20% by weight of a fluorinated bridged smectite clay, the amorphous matrix contains at least 10% by weight of alumina, the concentration of group VIII metal or metals expressed as oxide(s) thereof, with respect to the final catalyst, ranges from 0.01 to 5% by weight for group VIII noble metals and from 0.01 to 20% by weight for group VIII non-noble metals; or, the total concentration of groups VIII and VI B metals ranges from 5 to 40% by weight for the association of at least one group VIII non-noble metal with at least one group VI B metal, the carrier amount is sufficient to obtain a content of fluorinated bridged clay of at least 12% by weight of the final catalyst, the matrix amount corresponds to the amount necessary to total 100% by weight of the final catalyst in combination with (a) and (c) above.

2. A catalyst according to claim 1, characterized in that the carrier consists essentially of a mixture of 0–80% by weight of a non-fluorinated bridged clay associated with 20–100% by weight of fluorinated bridged clay.

3. A catalyst according to claim 2, wherein the mixture consists essentially of 5–50% of non fluorinated bridged clay and 50–95% of fluorinated bridged clay by weight.

4. A catalyst according to claim 1, wherein the bridges whereby the basal spacing between the bridged clay leaves is maintained consist essentially of alumina.

5. A catalyst according to claim 1, wherein the amorphous matrix contains at least 30% by weight of alumina.

6. A catalyst according to claim 1, wherein the amorphous matrix consists essentially of a silica-alumina containing at least 40% by weight of alumina.

7. In a process for hydrorefining oils, so as to improve their viscosity, under a pressure from about 4 to about 25 MPa, at a temperature from about 300° to about 500° C., a feed velocity from about 0.2 to about 2 liters per liter of catalyst and per hour and a hydrogen to hydrocarbons ratio ranging from about 250 to about 1500 1/1, the improvement comprising using a catalyst containing (a) a carrier, (b) an amorphous matrix and (c) at least one group VIII metal or compound of a group VII metal or an association comprising a group VI B metal or metal compound and at least one non-noble group VIII metal or metal compound, wherein in said catalyst:

the carrier contains at least 20% by weight of a fluorinated bridged smectite clay, the amorphous matrix contains at least 10% by weight of alumina.

the concentration of group VIII metal or metals expressed as oxide(s) thereof, with respect to the final catalyst, ranges from 0.01 to 5% by weight for group VIII noble metals and from 0.01 to 20% by weight for group VIII non-noble metals; or, the total concentration of groups VIII and VI B metals ranges from 5 to 40% by weight for the association of at least one group VIII non-noble metal with at least one group VI B metal, the carrier amount is sufficient to obtain a content of fluorinated bridged clay of at least 12% by weight of the final catalyst, the matrix amount corresponds to the amount necessary to total 100% by weight of the final catalyst in combination with (a) and (c) above.

8. A catalyst according to claim 2, wherein the amorphous matrix consists of a silica-alumina containing at least 40% by weight of alumina.

9. A catalyst according to claim 3, wherein the amorphous matrix consists of a silica-alumina containing at least 40% by weight of alumina.

10. A catalyst according to claim 1, wherein the amorphous matrix consists of a silica-alumina containing at least 40% by weight of alumina.

11. A catalyst according to claim 5, wherein the amorphous matrix consists of a silica-alumina containing at least 40% by weight of alumina.

12. A catalyst according to claim 5, wherein the amorphous matrix consists of a silica-alumina containing at least 40% by weight of alumina.

13. A catalyst according to claim 1, wherein the fluorinated bridged clay contained in the carrier has a basal spacing from 1.6 to 2.0 nm.

14. A catalyst containing (a) a carrier, (b) an amorphous matrix and (c) at least one group VIII metal or metal compound or an association comprising a group VII B metal or metal compound and at least one non-noble group VIII meta or metal compound wherein in said catalyst:

the carrier contains at least 20% by weight of a fluorinated bridged smectite clay, the amorphous matrix contains at least 10% by weight of alumina, the concentration of group VIII metal or metals expresses as oxide(s) thereof, with respect to the final catalyst, ranges from 0.01 to 5% by weight for group VIII noble metals and from 0.01 to 20% by weight for group VIII non-noble metals; or, the total concentration of groups VIII and VI B metals ranges from 5 to 40% by weight for the association of at least one group VIII non-noble metal with at least one group VI B metal, the carrier amount is sufficient to obtain a content of fluorinated bridged clay of at least 12% by weight of the final catalyst, the matrix amount corresponds to the amount necessary to total 100% by weight of the final catalyst in combination with (a) and (c) above, and the fluorinated bridged clay contained in the carrier has a specific surface from 200 to 600 m$^2$/g, a charge density from 0.6 to 1.8 meq/g, a basal spacing from 1.6 to 2.0 nm and a fluorine content from 0.01 to 4% by weight.

* * * * *